(12) United States Patent
Asfour et al.

(10) Patent No.: US 9,746,670 B2
(45) Date of Patent: Aug. 29, 2017

(54) DEVICE FOR PRESENTING INFORMATION NEAR THE EYES

(76) Inventors: Jean-Michel Asfour, Weinheim (DE); Hans-Peter Haar, Wiesloch (DE)

( * ) Notice: Subject to any disclaimer, the term of this patent is extended or adjusted under 35 U.S.C. 154(b) by 69 days.

(21) Appl. No.: 13/577,050

(22) PCT Filed: Feb. 3, 2011

(86) PCT No.: PCT/EP2011/051557
§ 371 (c)(1),
(2), (4) Date: Sep. 6, 2012

(87) PCT Pub. No.: WO2011/095544
PCT Pub. Date: Aug. 11, 2011

(65) Prior Publication Data
US 2012/0326949 A1 Dec. 27, 2012

(30) Foreign Application Priority Data

Feb. 4, 2010 (DE) .................. 10 2010 001 609

(51) Int. Cl.
*G02B 27/01* (2006.01)
*F21V 8/00* (2006.01)
*G02B 3/08* (2006.01)

(52) U.S. Cl.
CPC ......... *G02B 27/017* (2013.01); *G02B 6/0006* (2013.01); *G02B 6/0008* (2013.01); *G02B 27/0172* (2013.01); *G02B 3/08* (2013.01); *G02B 2027/0118* (2013.01); *G02B 2027/0132* (2013.01)

(58) Field of Classification Search
CPC ........... G09G 5/00; G02F 1/13; G02F 1/1335; G03H 1/00; F02B 27/14; G03B 21/00; G02B 27/0172; G06F 3/013; G06T 19/006
USPC ............................................. 345/8
See application file for complete search history.

(56) References Cited

U.S. PATENT DOCUMENTS

| 4,298,802 A * | 11/1981 | Quella ...................... F21K 2/00 136/247 |
| 4,377,750 A * | 3/1983 | Pape ........................ G02B 5/00 250/458.1 |
| 4,997,263 A * | 3/1991 | Cohen et al. ................... 349/11 |
| 5,546,099 A | 8/1996 | Quint |
| 5,594,560 A * | 1/1997 | Jelley et al. ..................... 359/15 |
| 5,796,374 A * | 8/1998 | Cone et al. ....................... 345/8 |

(Continued)

FOREIGN PATENT DOCUMENTS

| EP | 0825470 A1 | 2/1998 |
| EP | 1564578 A1 | 8/2005 |

(Continued)

*Primary Examiner* — Kent Chang
*Assistant Examiner* — Sujit Shah
(74) *Attorney, Agent, or Firm* — Boyle Fredrickson, S.C.

(57) ABSTRACT

The invention relates to a device for presenting information near the eyes, comprising a support (12) that can be carried on the head (10) of a user and comprising a monocular display unit (16) which is disposed on the support (12) and is positioned in a peripheral region of the field of vision of a first eye (14) of the user during use. According to a first aspect of the invention, a light-collecting unit (18, 20) on which ambient light can impinge is disposed on the support (12), and the light-collecting unit (18, 20) is coupled to the display unit (16) in order to illuminate same.

13 Claims, 2 Drawing Sheets

(56) References Cited

U.S. PATENT DOCUMENTS

| | | | | |
|---|---|---|---|---|
| 6,046,712 | A * | 4/2000 | Beller | G02B 27/017 |
| | | | | 345/7 |
| 6,181,304 | B1 * | 1/2001 | Robinson et al. | 345/8 |
| 6,293,519 | B1 * | 9/2001 | Farretta | H02G 1/083 |
| | | | | 254/134.3 FT |
| 6,771,423 | B2 * | 8/2004 | Geist | 359/630 |
| 2001/0030631 | A1 * | 10/2001 | Park | 345/8 |
| 2002/0089469 | A1 * | 7/2002 | Cone et al. | 345/8 |
| 2002/0186180 | A1 * | 12/2002 | Duda | 345/8 |
| 2004/0008157 | A1 * | 1/2004 | Brubaker | G02B 27/0176 |
| | | | | 345/8 |
| 2005/0078236 | A1 * | 4/2005 | Kwok | 349/71 |
| 2006/0017657 | A1 * | 1/2006 | Yamasaki | 345/8 |
| 2006/0119539 | A1 | 6/2006 | Kato et al. | |
| 2006/0119540 | A1 * | 6/2006 | Dobson et al. | 345/8 |
| 2007/0258015 | A1 * | 11/2007 | Diederiks | H04N 5/72 |
| | | | | 348/739 |
| 2008/0291277 | A1 * | 11/2008 | Jacobsen et al. | 348/158 |

FOREIGN PATENT DOCUMENTS

| | | |
|---|---|---|
| FR | 2677464 A1 | 12/1992 |
| GB | 2238627 A | 6/1991 |
| JP | 4341078 A | 11/1992 |

\* cited by examiner

DEVICE FOR PRESENTING INFORMATION NEAR THE EYES

BACKGROUND AND SUMMARY OF THE INVENTION

The invention concerns a device for presenting information near the eyes having a holder designed to be worn on the head of a user, preferably as a head covering or eyeglasses, and having a monocular display unit disposed on the holder, positioned, when in use, in a peripheral visual field range of a first eye of the user.

There are known display units to be worn on the head, provided with a display unit for stationary use and, apart from being heavy, have disadvantages regarding the possibility of an undisturbed observation of the vicinity as well. Moreover, display systems are mainly known in the military field, which project, using expensive technology, important information for the user, a pilot for example, into the field of view, wherein the power supply usually plays an insignificant role.

Based on this, the invention assumes the objective of designing the device known in the prior art in such a manner that the information presentation can take place ergonomically in a compact mobile display unit, having a low production costs without particularly limiting the user in his activities.

To attain this objective, the characteristic combinations disclosed in claim 1 or 8, respectively, are suggested. Advantageous designs and further developments of the invention result from the dependent claims.

The intention of the invention is to adjust the display to the ambient brightness and thereby to optimize the readability. Correspondingly, in accordance with a first aspect of the invention, it is suggested that a light collecting unit that can be loaded with ambient light is disposed on the holder, and that the light collecting unit is coupled with the display unit in such a way that the ambient light is used for the illumination thereof. With this, a bright and contrast-rich display can be realized without costly energy sources, whereby simple manufacturing and ergonomic use, as well as an adaptive adjustment to the ambient light intensity, are also made possible.

Advantageously, the light collecting unit comprises a light conductor structure which receives the ambient light through a preferably upward-facing entry surface and emits the light onto an exit surface connected, or optically coupled, to the display unit. In this manner, a simple automatic contrast control, dependent on the ambient brightness, is possible.

A further improvement is made possible in that the light collecting unit contains an excitable fluorescent or phosphorescent coloring for illumination by means of captured ambient light, preferably within the yellow to green wavelength range. In this way the ambient light can be homogenized independently of the input direction and displaced in the wavelength to a preferred contrast color, wherein UV components are then also usable for the illumination.

A further advantageous possibility for adaptive contrast control exists in the light collector unit having a solar cell charged by means of ambient light for powering the display illumination, or a self-lighting display unit in accordance with the ambient light intensity. Here the output current of the solar cell is used directly for the generation of light for the display unit.

It is basically also possible for the display unit to comprise an auxiliary lighting source, powered by means of a battery, a storage capacitor and/or a solar cell, preferably coupled via the light conductor structure. In this case, a preferably short demand-driven activation of the energy source occurs, such that a long operating time is obtained without involving the user. In this context, it is also beneficial if the connectable light source is adjusted to the display unit's wavelength or light color obtained by the light collecting unit.

Advantageously, the light collecting unit is equipped to penetrate the information-giving display surface of the display unit with transmitted light or irradiate it with incident light, so that a good readability is ensured for any conditions. With this, it is especially beneficial when the display unit comprises a LCD-module, such that, with a compact construction, complex information is also presentable.

A second invention aspect, or special variation, is a protective shield on the holder disposed in a peripheral facial area of the second eye of the user, masking the second segment of the facial area. Advantageously, the masked sections are adjusted to one another for the quick detection of the displayed information. In this way the second passive eye is not irradiated asymmetrically with light, such that the visual impression is not disturbed and the first, active, eye can register the information quickly.

This is particularly advantageous if the contour and position of the protective shield are determined in such a way that the field of vision sections blinded by the display unit and the protective shield correspond substantially in size and position relative to the respective eye.

A further optimization is possible in that the position of the protective shield preferably designed as a black, light-absorbing aperture is adjustable, particularly in a guide, enabling an anatomical adaptation to the user. A further improvement can be achieved in that the display unit is located in a viewing axis of the first eye and the protective shield is located in a viewing axis of the second eye, and that the two viewing axes are substantially parallel to each other.

To adjust the image size suitably, it is advantageous if the display unit facing one of the observing eyes of the user comprises an optical lens unit, particularly in the form of a Fresnel lens. This can advantageously be achieved structurally in that the display unit is disposed as a structural unit with the optical lens in a casing that can be attached in a fixed manner to the holder.

To not restrict the central visual field unnecessarily and nevertheless ensure a rapid readability, it is advantageous if the display unit is disposed, preferably displaced upward, at an angle of more than 15° with respect to the central axis of the monocular visual field of the first eye.

To further improve the ergonomics, it is advantageous if the display unit, and optionally, the protective shield, are displaced on the lower surface of a, part of the holder protruding from the forehead of the user, above the eyes of said user when in use, disposed, particularly, on the visor of a headgear or on the bill of a peaked cap. As a holder, an anti-glare cap (Visor Cap) is also advantageous, consisting of a visor and an elastic head band.

Advantageously, the information is transmittable via a control unit to the display unit and is visually presented there via alphanumeric or graphic symbols, whereby the control unit is preferably connected to an external information source linked via a wireless data transmission path, such that the display itself can be constructed to be compact and light. A further improvement, also with respect to weight distribution and protection against damage, can be achieved in that the control unit is disposed on or in a part of the holder, in particular on a visor of a head covering.

To allow an ergonomic, and at the same time, a demand-mode of operation, it is advantageous if a switch unit for activating and/or switching over to the display unit is disposed on the holder.

BRIEF DESCRIPTION OF THE DRAWINGS

In the following, the invention will be explained in more detail, based on a drawing of an embodiment example depicted in a schematic manner.

It shows.

DETAILED DESCRIPTION OF THE INVENTION

Figure 1:
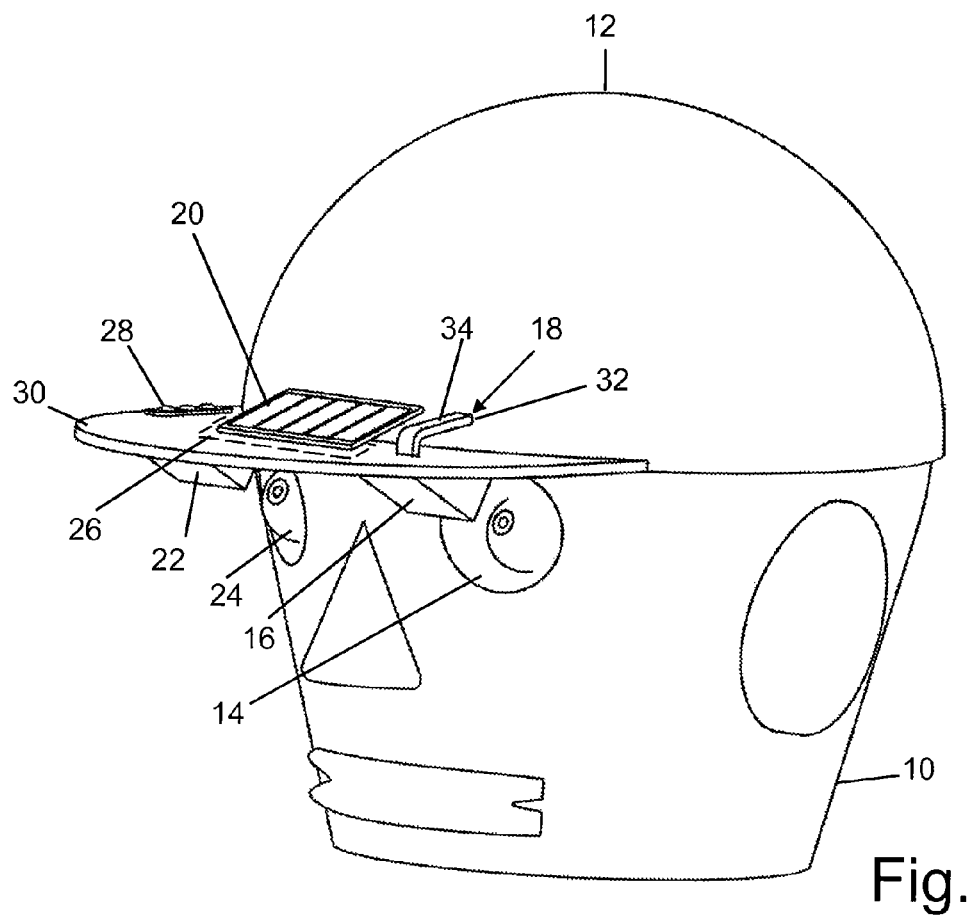
FIG. 1 display device that can be mounted on a cap, for the presentation of information near the eyes, in a diagrammatic representation.

The display device illustrated in the drawings comprises a holder 12, in this case in the form of a cap, that can be worn on a head of a user, a monocular display unit 16 disposed thereon, and when in use, in the peripheral visual field range of a first eye 14 of the user, at least one light collecting unit 18, 20 that can be loaded with ambient light, for an illumination of the display unit 16 adjusted to the ambient light intensity, a protective shield 22 in the peripheral visual field range of a second eye 24 of the user, a control unit 26 for the display unit 16, and a switch unit 28 for manual switching functions.

According to FIG. 1, the entire device is attached to a visor 30 on a cap 12 in such a manner that the central field of vision is not significantly impaired, yet the information to be displayed is detectable, with as little accommodating change by means of a short-term change of the viewing direction of the eye 14 to 25° upwards. In this context, the field of vision refers to the respective central and peripheral visual range, and can be perceived visually with a steady position of the head and an unmoving gaze directed straight ahead, wherein a distinction is made between the monocular visual field of the right and left eyes, and the binocular visual field of both eyes 14, 24.

The light collecting unit 18 is formed by a light conductor 32 which receives the ambient light mainly on an upwardly facing entry surface 34, and forwards it to the display unit 16. In this way, an adaptive display brightness adjustment to the ambient light is achieved. For this purpose, the light conductor 32 contains a fluorescent coloring that can be excited in the wavelength range of green to yellow such that the collected ambient light is homogenized, and the UV component is also usable for a high-contrast display.

Alternatively, or in addition to the light conductor 18, a solar cell module 20 may also be provided as a light collector for the ambient light, wherein a photocurrent for the illumination of the display unit 16 is also adaptively realizable in accordance with the ambient light intensity. It is also conceivable that an actively luminous display unit can be operated with this, for example, based on LEDs or OLEDs. It is also fundamentally possible to use the solar cell module 20 for charging a battery.

Figure 2:
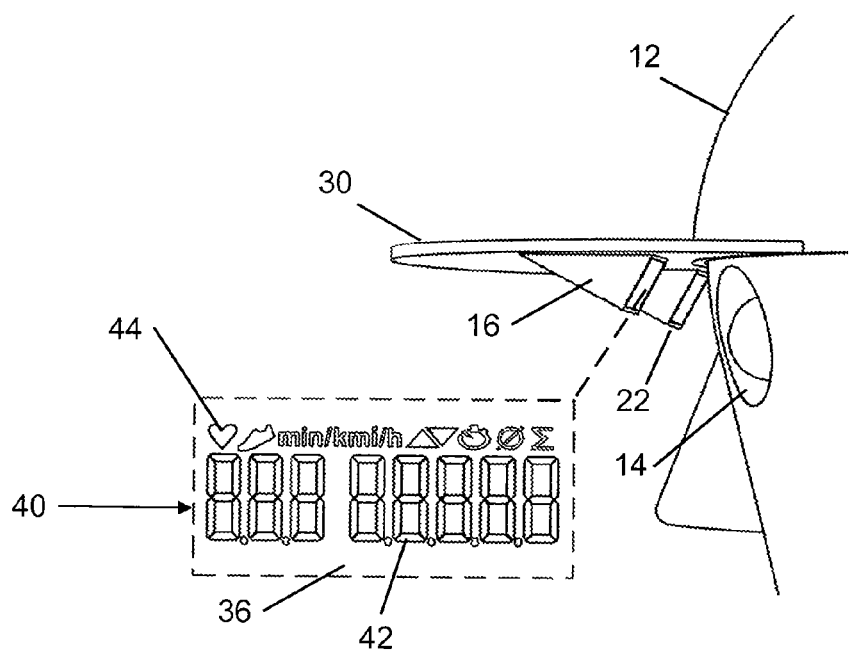
FIG. 2 a detail from FIG. 1 from a different perspective.

As illustrated in FIG. 2, the display unit 16 has an information-reproducing display area 36 irradiated by transmitted light from the light collecting unit 18, such that the optical contrast for reading the information is substantially independent of the ambient brightness. For this purpose, a transmitted-light LCD module 40 can be used, which presents alphanumeric symbol elements 42 and/or graphic symbols 44, for example, for displaying a user activity such as running speed or heart rate, that can be toggled, if necessary, by means of a switching unit 28.

Due to its shape, the display unit masks a first section 16 of the peripheral visual field of the first eye 14. In order not to disrupt the binocular visual impression, and to avoid blinding the other eye 24, the protective shield 22 is disposed in the peripheral visual field of the second eye 24, in such a way that a second cut-out, corresponding in size and viewing direction to the first cut-out, is masked there. To achieve this, the contour and position of the protective shield 22 is adjusted to the display unit 16. For this, the two units 16, 22 are symmetrically disposed with respect to a plane running between the eyes 14, 24 at their centers. It is preferable that the visual axes of the two eyes 14, 24 run parallel to one another toward the respective dedicated units 16, 22. Expediently, a adjustment possibility for positioning adjustment is provided for adapting said unit to the anatomy of the user.

Figure 3:
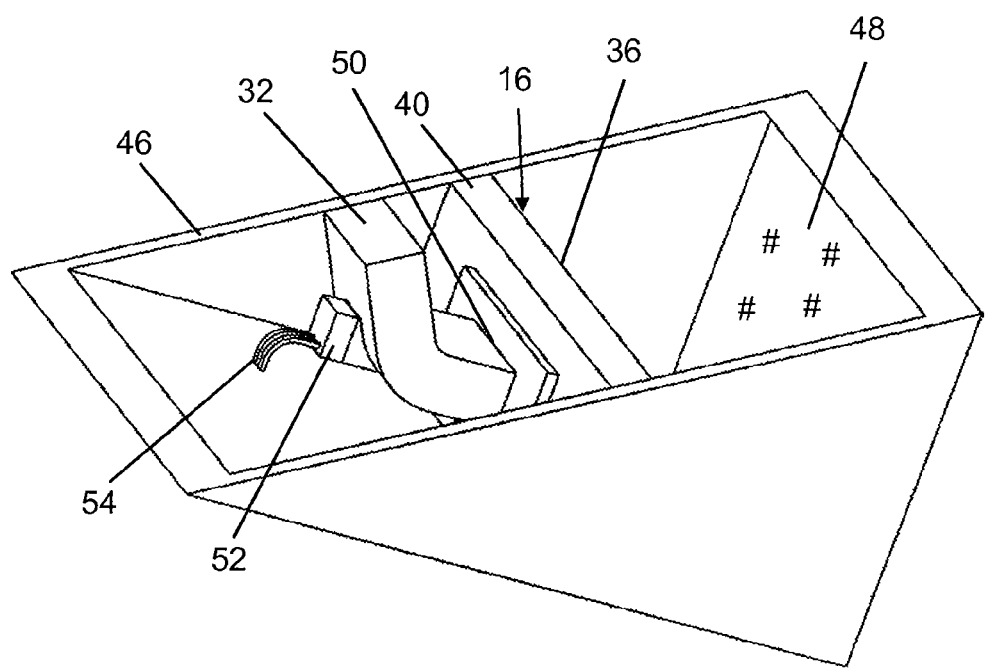
FIG. 3 a display unit of the device according to FIG. 1 in a perspective view.

As shown in FIG. 3, the display unit is a structural unit with the optical lens disposed in a casing 46 that can be attached in a fixed manner on the cap visor 30. A Fresnel lens is installed 48 on the front surface facing the user, which ensures a virtual image distance of a few meters from the display surface 36 of the LCD, such that no accommodation by the eye 14 is required. The display unit 16 can thus be positioned as a unit with the lens 48 for a direct beam path in the visual field, without an image deflection or projection from a remote image generator being required.

FIG. 3 also shows that the broken off light conductor 32 depicted therein has an exit end 50 which is connected at the back to of the transmitted-light LCD module 40. As an auxiliary light source, a LED 52 can be provided which is powered with electricity via electrical leads 54, and is flanged laterally onto the light conductor 32.

Figure 4:
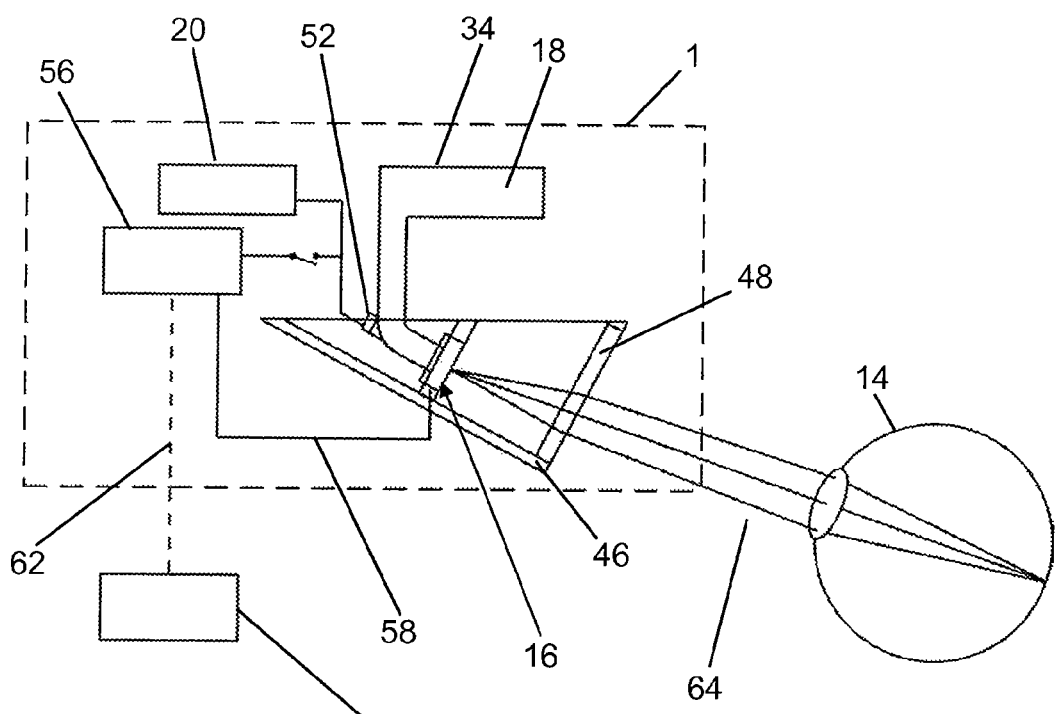
FIG. 4 a block diagram of the display device.

In the symbolic representation according to FIG. 4, the elements of the display unit 1 are provided with the same reference numerals as described above. The information to be displayed can be transmitted by a control unit 56 via a flexible cable 58 connected to the display unit 16. In this case, information concerning the state of the user, as well as local and time interval formations and information provided by other persons, can be obtained from an external information source 60 via a wireless data communication path 62, in particular via a Bluetooth connection. For example, an external information source of this kind may be realized by a sensor which detects the measurement parameters regarding a sports activity of the user. The information presented on the display surface 36 corresponding to the information beam path 64 can be read by the user with the first eye 14. For display backlighting, the auxiliary light source 52 can be supplied with operating current by a solar panel 20, or alternatively, supplied by a power source of the control unit 56 that can be connected thereto.

Instead of a cap, other possible holders that can be worn on the head 10 are conceivable, with or without additional functions, in particular, glasses such as safety glasses, ski goggles or diving goggles, or helmets as well, in particular, ski helmets, bicycle helmets, motorcycle helmets or other protective helmets.

The invention claimed is:

1. A device for presenting information near the eyes, comprising:

a holder that can be worn on the head of a user, wherein, when in use, the holder is positioned above the eyes of the user, and wherein the holder defines an upwardly facing surface and a downwardly facing surface;

a casing defining an interior, wherein the casing is stationarily fixed to the holder and is positioned such that the interior of the casing is located below the downwardly facing surface of the holder and the downwardly facing surface of the holder overlies the interior of the casing;

a display unit disposed in the interior of the casing, wherein, when in use, the display unit is positioned in a peripheral visual field of at least one eye of the user and wherein the display unit includes a rear surface that faces rearwardly within the casing interior and a forwardly facing display surface that faces forwardly within the casing interior; and a light collecting unit located upstream of the display unit, wherein the light collecting unit comprises a solid light conductor member separate from the casing and having an upwardly facing light entry portion located outside the interior of the casing and above the holder, and a light conductor portion extending downwardly from the upwardly facing light entry portion and through the holder and into and through the casing interior to a location rearwardly of the display unit, wherein the light conductor portion terminates in an exit end, wherein the holder is positioned between the rear surface of the display unit and the upwardly facing light entry portion of the light conductor member, and wherein the exit end of the light conductor portion is located adjacent the rear surface of the display unit, wherein the upwardly facing light entry portion of the light conductor member is loaded by ambient light that is transmitted through the holder by the light conductor portion and to the exit end of the light conductor portion, wherein the light from the exit end of the light conductor portion is emitted to the rear surface of the display unit and illuminates the forwardly facing display surface of the display unit;

wherein the light conductor member contains a fluorescent or phosphorescent coloring separate from the display unit, wherein the fluorescent or phosphorescent coloring is excitable by the collected ambient light in the green to yellow wavelength range as the light is transmitted through the light conductor portion and emitted to the rear surface of the display unit for illumination of the forwardly facing display surface of the display unit.

2. The device according to claim 1, further comprising a solar cell configured to operate the display unit.

3. The device according to claim 1, wherein the display unit comprises an auxiliary lighting source, powered by a battery, a storage capacitor and/or a solar cell.

4. The device according to claim 1, wherein the exit end of the light conductor portion penetrates with transmitted light, or irradiates with incident light, the display surface of the display unit that displays information.

5. The device according to claim 1, wherein the display unit comprises a LCD module.

6. The device according to claim 1, wherein the display unit faces a first eye of a user and comprises an optical lens in the form of a Fresnel lens.

7. The device according to claim 1, wherein the display unit is disposed as a structural unit with an optical lens in the casing, and wherein the casing can be attached to the holder in a fixed manner.

8. The device according to claim 1, wherein the display unit is disposed at an angle of more than 15° with respect to a central axis of a monocular visual field of a first eye of a user and is preferably displaced upwards.

9. The device according to claim 1, wherein the holder comprises a visor and wherein the display unit is located on a lower surface of the visor such that the display surface is positioned above the eyes of the user.

10. The device according to claim 1, wherein information can be transmitted onto the display unit via a control unit and can be presented there visually via alphanumeric or graphic symbols, and that the control unit is preferably connected with an external information source via a wireless data transmission path.

11. The device according to claim 10, wherein the control unit is disposed on or in a part of the holder, in particular on a visor of a head covering.

12. The device according to claim 1, wherein a switch unit is disposed on the holder for activating and/or toggling to the display unit.

13. The device according to claim 1, wherein the display unit is self-lighting in accordance with the ambient light intensity.

* * * * *